(12) United States Patent
Kim et al.

(10) Patent No.: US 12,095,206 B2
(45) Date of Patent: Sep. 17, 2024

(54) THREADED FASTENER RETENTION DETECTION

(71) Applicant: Microsoft Technology Licensing, LLC, Redmond, WA (US)

(72) Inventors: Donghwi Kim, Kirkland, WA (US); Jaejin Lee, Redmond, WA (US); Manish Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 17/739,945

(22) Filed: May 9, 2022

(65) Prior Publication Data

US 2023/0361513 A1 Nov. 9, 2023

(51) Int. Cl.
*H05K 1/02* (2006.01)
*G06F 21/88* (2013.01)
(Continued)

(52) U.S. Cl.
CPC ......... *H01R 13/6683* (2013.01); *G06F 21/88* (2013.01); *H01R 12/7047* (2013.01)

(58) Field of Classification Search
USPC ........ 361/761; 439/331; 324/756.02, 756.05; 29/407.05, 456
See application file for complete search history.

(56) References Cited

U.S. PATENT DOCUMENTS 5,313,701 A * 5/1994 Klinger .............. H05K 7/20854
324/555
5,629,837 A * 5/1997 Barabi ............... H01R 13/2464
361/767

(Continued)

FOREIGN PATENT DOCUMENTS

CN 215297443 U 12/2021
EP 0720224 B1 11/2007
(Continued)

OTHER PUBLICATIONS

"International Search Report and Written Opinion Issued in PCT Application No. PCT/US2023/013573", Mailed Date: Jun. 30, 2023, 12 Pages.
"Fasteners for Use with PC Boards", Retrieved from: https://www.pemnet.com/fastening_products/pdf/kdata.pdf, Jan. 10, 2022, 24 Pages.
(Continued)

*Primary Examiner* — Xiaoliang Chen
(74) *Attorney, Agent, or Firm* — Holzer Patel Drennan (57) ABSTRACT

Portable electronic devices by their nature are designed to be regularly physically repositioned and relocated, which can cause significant mechanical stresses on internal components, including printed circuit boards (PCBs). This is particularly true when a portable electronic device is handled roughly. These significant mechanical stresses can cause threaded mechanical fasteners securing the PCBs to become dislodged. A dislodged threaded mechanical fastener may contact electrically conductive features of the PCB or other internal components, thereby causing a ground fault or short. At a minimum, this may cause the portable electronic device to not work well, or at all. Further, this may cause the portable electronic device to overheat and become a fire hazard. The presently disclosed technology detects if the threaded mechanical fasteners within a portable electronic device become dislodged. A user of the portable electronic device may then be warned, and the portable electronic device may be powered down.

15 Claims, 6 Drawing Sheets

(51) Int. Cl.
  *H01R 4/36* (2006.01)
  *H01R 9/03* (2006.01)
  *H01R 12/70* (2011.01)
  *H01R 13/66* (2006.01)
  *H05K 1/03* (2006.01)

(56) References Cited

U.S. PATENT DOCUMENTS

| | | |
|---|---|---|
| 6,493,233 B1 | 12/2002 | De et al. |
| 6,850,411 B1 | 2/2005 | Patel |
| 9,426,904 B2 | 8/2016 | Fitzsimmons et al. |
| 10,348,158 B2 * | 7/2019 | Niwa .................. H02K 9/02 |
| 2003/0150093 A1 * | 8/2003 | Campbell ........... B25B 27/0014 |
| | | 29/407.05 |
| 2007/0020983 A1 * | 1/2007 | Yang .................. G01R 1/0466 |
| | | 439/331 |
| 2008/0310130 A1 | 12/2008 | Monda et al. |
| 2011/0312222 A1 * | 12/2011 | Tanaka ................. H01R 4/36 |
| | | 439/626 |
| 2013/0032463 A1 * | 2/2013 | Nakajima ............. H01H 19/04 |
| | | 200/564 |
| 2015/0139755 A1 * | 5/2015 | Lu ..................... H05K 7/142 |
| | | 411/510 |
| 2016/0190542 A1 * | 6/2016 | Sengoku ............. H01M 50/50 |
| | | 429/90 |
| 2018/0252767 A1 * | 9/2018 | Thurmaier ........... G01R 1/0433 |
| 2021/0164459 A1 * | 6/2021 | Okada .................. F04B 39/06 |

FOREIGN PATENT DOCUMENTS

| | | |
|---|---|---|
| EP | 2465102 A1 | 6/2012 |
| JP | H08278780 A | 10/1996 |
| JP | 6241198 B2 | 11/2017 |

OTHER PUBLICATIONS

"Spring Fingers", Retrieved from: https://www.te.com/content/dam/te-com/documents/consumer-devices/global/6-1773460-8_Spring_Fingers-qrg.pdf, Nov. 16, 2021, 6 Pages.

* cited by examiner

THREADED FASTENER RETENTION DETECTION

BACKGROUND

A printed circuit board (PCB) mechanically supports and electrically interconnects an array of electronic components using conductive traces, vias, and other features etched from metallic sheets laminated onto a non-conductive substrate within an electronic device chassis. Typically, the PCB is physically secured within the chassis using one or more threaded mechanical fasteners (e.g., bolts or screws).

SUMMARY

Implementations described and claimed herein provide a printed circuit board (PCB) fastener retention detection system for a portable electronic device. The system comprises a chassis for the portable electronic device including a threaded mating fixture. The system further comprises a PCB including a fastener hole, a fastener detection circuit, and a ground plane, wherein the fastener hole is axially aligned with the threaded mating fixture. The system still further comprises a threaded mechanical fastener extending through the fastener hole and seated within the threaded mating fixture thereby securing the PCB to the device chassis, the threaded mechanical fastener electrically grounded through one or both of the ground plane and the threaded mating fixture, the threaded mechanical fastener in compressive electrical contact with a lead to the fastener detection circuit. The system further still comprises a comparator to determine that the threaded mechanical fastener is seated within the threaded mating fixture by way of the detection circuit being electrically grounded through one or both of the ground plane and the threaded mating fixture.

Implementations described and claimed herein further provide a method of detecting fastener retention within a portable electronic device. The method comprises inserting a threaded mechanical fastener through a fastener hole in a printed circuit board (PCB) and seat the threaded mechanical fastener within a threaded mating fixture of a chassis for the portable electronic device thereby securing the PCB to the device chassis. The threaded mechanical fastener is electrically grounded through one or both of a ground plane for the PCB and the threaded mating fixture. The threaded mechanical fastener is in compressive electrical contact with a lead to a fastener detection circuit. The method further comprises detecting using a comparator that the threaded mechanical fastener is seated within the threaded mating fixture by way of the fastener detection circuit being electrically grounded through one or both of the ground plane and the threaded mating fixture.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

Printed circuit boards (PCBs) are a fundamental component used in nearly all electronics. PCBs provide electrical connections and mechanical support to electronic components and are generally made of copper layers laminated onto, though, and/or between one or more non-conductive substrate layers. The copper layers are etched with traces, planes and other features to create electrical connections for the electronic components. Vias are formed through the non-conductive substrate layers to connect electronic components on opposing sides of the substrate layer(s).

PCBs are used in a variety of electronic devices, including computing devices, that are portable (e.g., mobile computing devices). Portable electronic devices by their nature are designed to be regularly physically repositioned and relocated, which can cause significant mechanical stresses on internal components, including PCBs. This is particularly true when a portable electronic device is handled roughly, either intentionally (such as when the portable electronic device is by a child) or unintentionally (such as when the portable electronic device is dropped). These significant mechanical stresses can cause one or more threaded mechanical fasteners securing one or more PCBs within the portable electronic device to become gradually or suddenly dislodged from their respective mounting locations.

Beyond loosening the PCB mounting within the portable electronic device, a dislodged threaded mechanical fastener may contact traces, vias, or other electrically conductive features of the PCB, battery terminals, or electrically conductive features of other components within the portable electronic device, thereby causing a ground fault or short within the portable electronic device. At a minimum, this may cause the portable electronic device to not work well, or at all. Further, this may cause the portable electronic device to overheat and potentially become a fire hazard.

The presently disclosed technology provides systems and methods for detecting if one or more threaded mechanical fasteners within a portable electronic device become dislodged. A user of the portable electronic device may then be warned, and the portable electronic device may be powered down to avoid further damage and mitigate the potential fire hazard.

Further, errors in manufacturing can cause a threaded mechanical fastener to be inadequately screwed into its threaded mating fixture or not screwed in at all. Absent the presently disclosed technology, these errors in manufacturing may be difficult to detect. The presently disclosed technology provides systems and methods for detecting a manufacturing error and notifying production personnel that a threaded mechanical fastener may be loose within a portable electronic device under construction.

Figure 1:
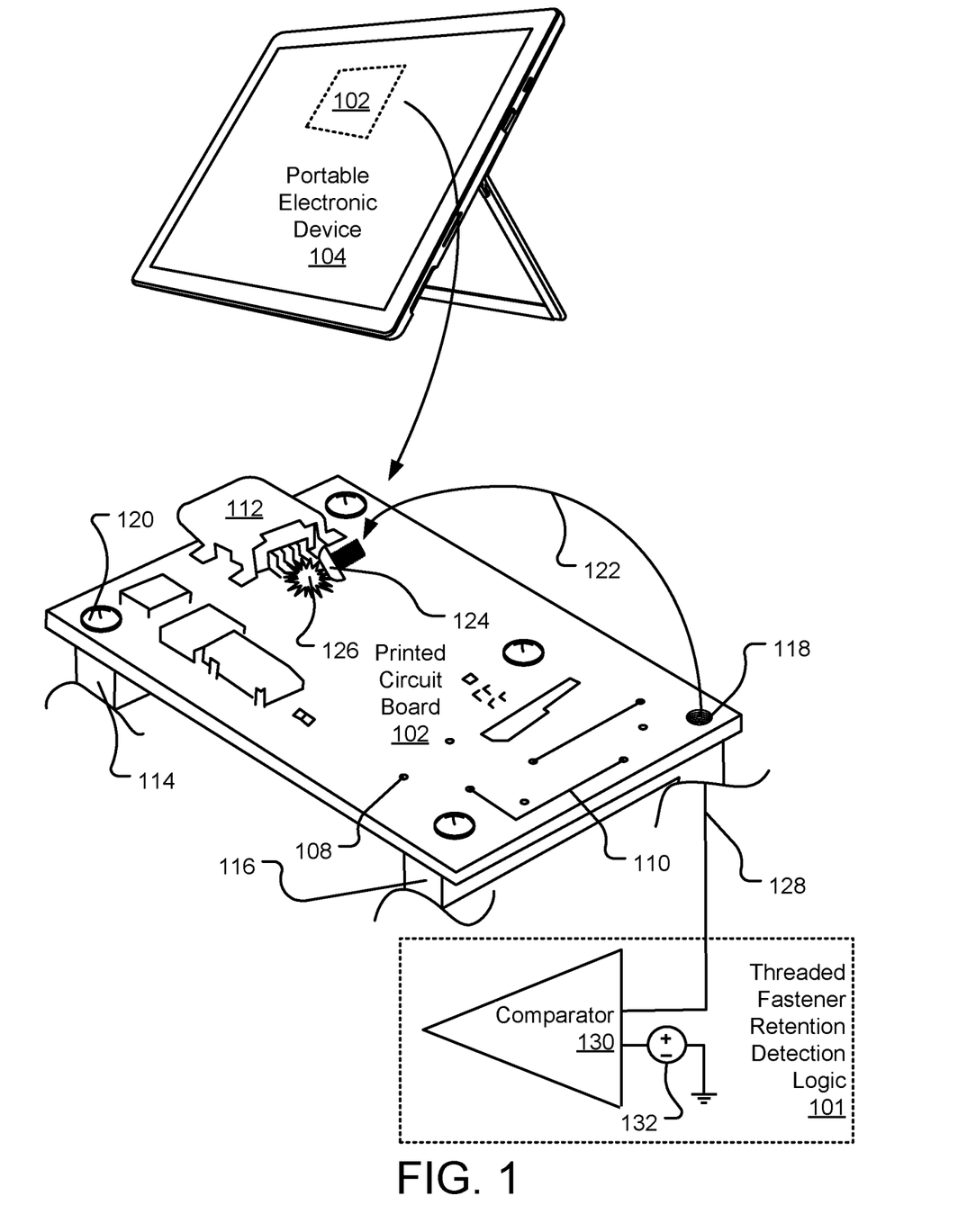
FIG. 1 illustrates a perspective view of a printed circuit board (PCB) incorporating example threaded fastener retention detection logic mounted within a portable electronic device.

FIG. 1 illustrates a perspective view of a printed circuit board (PCB) 102 incorporating example threaded fastener retention detection logic 101 mounted within a portable electronic device 104. While the portable electronic device 104 is illustrated as a tablet computer, the detection logic 101 may be incorporated into any computing device (e.g., mobile phones, tablet computers, laptop computers, personal computers, gaming devices, smart phones, keyboards, mice, or any other mobile computing device that receives physical user inputs and carries out one or more sets of arithmetic and/or logical operations) or mobile input device for a computing device (e.g., handheld controllers, keyboards, trackpads, and mice). Further, the detection logic 101 may be applied to vehicles (e.g., automobiles, watercraft, and aircraft), consumer electronics (e.g., cameras, telephones, and home appliances), medical devices, and industrial or commercial machinery.

The PCB 102 is depicted in broken lines within the portable electronic device 104 as it is concealed with the device 104 housing. In various implementations, PCB 102 may be a variety of shapes and sizes and located in a variety of spaces within the device 104 housing. Further, the device 104 housing may incorporate more than one of the PCB 102 that share the detection logic 101, or each of the PCBs having its own detection logic 101.

The PCB 102 includes an insulating substrate (e.g., a woven fiberglass cloth with an epoxy resin binder) with a network of conductive vias (e.g., via 108), traces (e.g., trace 110) and other conductive paths or areas thereon. The PCB 102 may include a variety of electronic components soldered to the network of conductive paths on a first side (not shown) of the substrate and other electronic components (e.g., electronic component 112) soldered to the network of conductive paths on the depicted second side of the substrate to create a functional electrical network interconnecting the electronic components on both sides of the substrate, as well as through the substrate.

In various implementations, the electronic components may include batteries, capacitors, resistors, microprocessors, storage devices, etc. The PCB 102 may be single-sided (e.g., having one layer forming the conductive network), double-sided (e.g., having two conductive layers forming the conductive network) or multi-layer (e.g., having inner and outer conductive layers forming the conductive network). Various implementations of the detection logic 101 described herein may be implemented on single-sided, double-sided, or multi-layer PCBs.

Conductive paths on different sides of the PCB 102 may be connected with vias. In various implementations, a far greater number and complexity of conductive traces, vias, and other paths, as well as electronic components, are included in the PCB 102 as compared to that shown in FIG. 1. Further, PCBs as referred to herein are defined as any insulating substrate with a network of conductive paths formed thereon or therein. In various implementations, the substrate may include ceramics, fiberglass, plastics (e.g., flexible polymers), or any combination thereof. In one example implementation, the PCB 102 is a flexible printed circuit ("FPC") on a polyimide substrate. The conductive paths or areas are generally made of copper alloys (also referred to as simply copper herein).

The PCB 102 is mounted within the portable electronic device 104 using threaded mating fixtures 114, 116 (e.g., structural portions of a chassis or midframe for the portable electronic device 104). Fastener holes (e.g., fastener hole 118) are provided in the PCB 102 that match and axially align with corresponding threaded mating fixtures (not shown) in the threaded mating fixtures 114, 116 that allow screws (e.g., screw 120) to secure the PCB 102 to the threaded mating fixtures 114, 116.

If one or more of the screws (or other threaded fasteners) become loose and dislodge from their respective threaded mating fixtures in the threaded mating fixtures 114, 116, the screws may move within the portable electronic device 104 in an uncontrolled manner. This is illustrated by arrow 122 depicting screw 124 dislodging from fastener hole 118 and contacting electrical connections for the electronic component 112. Absent the presently disclosed technology, this uncontrolled contact may cause a ground fault or short, as illustrated by starburst 126. The technical benefit of the presently disclosed technology is rapid detection of the aforementioned uncontrolled contact, which triggers mitigation efforts (e.g., warnings or automatic shut-down of the portable electronic device 104) prior to a ground fault or short caused by the loose screw 124.

The detection logic 101 detects that the screw 124 has dislodged from fastener hole 118 and can shut down the portable electronic device 104 before the screw 124 has an opportunity to cause the ground fault or short illustrated by the starburst 126. More specifically, the detection logic 101 includes one or more inputs 128 into comparator 130 (e.g., a microcontroller), each of the inputs corresponding to a threaded fastener that the detection logic 101 is monitoring. Electrical hysteresis and threshold control 132 calibrates the comparator 130 to consistently detect dislodged threaded fasteners within the portable electronic device 104. The comparator 130 filters the incoming signals from the inputs 128 corresponding to each threaded fastener, monitors the incoming signals for a signal that corresponds to a dislodged threaded fastener, and directs user notification and/or system shutdown of the portable electronic device 104 should a dislodged screw be detected.

In various implementations, the comparator 130 and associated electrical hysteresis and threshold control 132 represents a series of comparators and associated controls, each electrically connected to one of the monitored threaded fasteners, and each responsible for detection that its assigned threaded fastener has become dislodged from its fastener hole. This may be referred to herein as parallel comparators. Any one of the comparators outputting a signal indicating a dislodged comparator may trigger a user notification and/or system shutdown of the portable electronic device 104.

Figure 2:
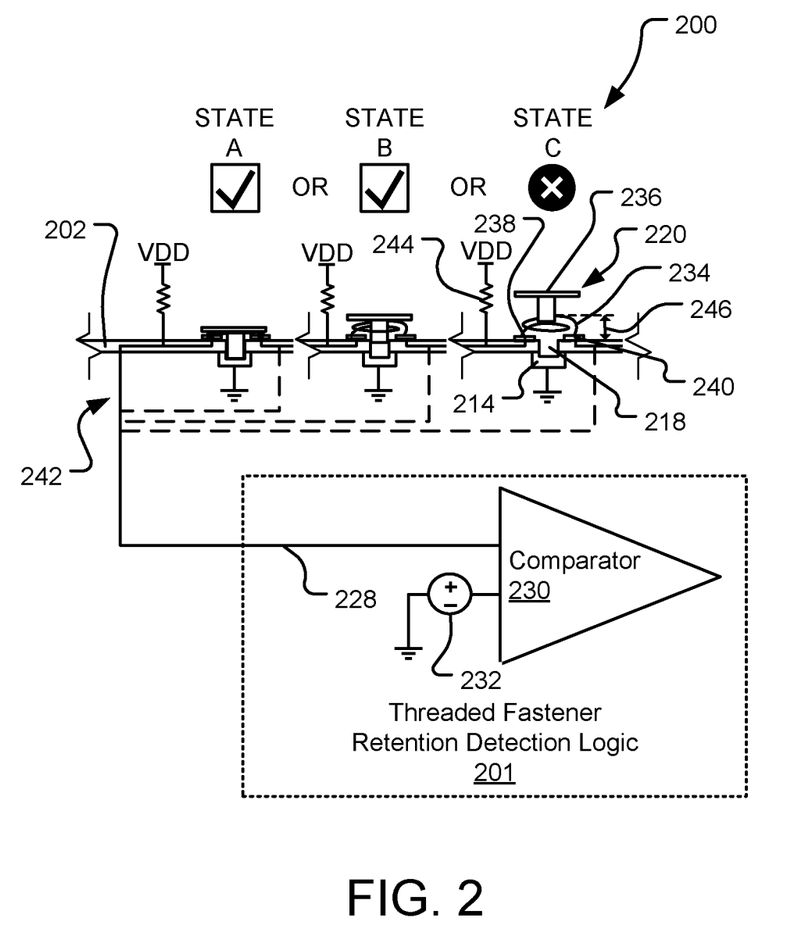
FIG. 2 illustrates a sectional elevation view of a printed circuit board (PCB) incorporating an example threaded fastener retention detection system operating in three separate states.

FIG. 2 illustrates a sectional elevation view of a printed circuit board (PCB) 202 incorporating an example threaded fastener retention detection system (or PCB fastener retention detection system) 200 operating in three separate states (STATE A, STATE B, and STATE B). The PCB 202 may be located within a portable electronic device (not shown). The PCB 202 may be a variety of shapes and sizes and located in a variety of spaces within a housing for the portable electronic device. Further, the device housing may incorporate more than one of the PCB 202 that share detection logic 201, or each of the PCBs having its own detection logic 201.

The PCB 202 includes an insulating substrate with a network of conductive vias, traces, and other conductive paths or areas thereon. The PCB 202 further includes a variety of electronic components (e.g., batteries, capacitors, resistors, microprocessors, storage devices, etc.) soldered to the network of conductive paths on one or both sides of the substrate to create a functional electrical network interconnecting the electronic components on one or both sides of the substrate, as well as through the substrate. In various implementations, the PCB 202 may be single-sided, double-sided, or multi-layer.

The PCB 202 is mounted within the portable electronic device using threaded mating fixture 214 (e.g., a structural portion of a chassis or midframe for the portable electronic device or a boss attached to the underside of the PCB 202). Fastener hole 218 is provided in the PCB 202 that matches a corresponding threaded hole (not shown) in the threaded mating fixture 214 that allows screw 220 to secure the PCB 202 to the threaded mating fixture 214. A retention spring 234 (e.g., a helical coil or a spring washer) is placed around the screw 220 and between screw head 236 and one or more leads (e.g., contact pads 238, 240) on opposing sides of the fastener hole 218 to a fastener detection circuit 242. In other implementations, a singular lead to the fastener detection circuit 242 is used.

The retention spring 234 provides a configurable tolerance for the screw 220 to be partially loosened from the threaded mating fixture 214, but still sufficiently attached to allow the portable electronic device to continue normal operation (see e.g., STATE B, discussed below). The stroke and compression profile of the retention spring 234 defines the tolerance for the screw 220 to be partially loosened from the threaded mating fixture 214. For example, the retention spring 234 includes a stroke that defines tolerance 246, which in turn defines the difference between STATE B and STATE C, both of which are described in further detail below. The retention spring 234 also accounts for noise in the fastener detection circuit 242 caused by a slight looseness of the screw 220. In other implementations, the retention spring 234 is omitted and the detection system 200 incorporates little to no tolerance for the screw 220 to be loosened from the threaded mating fixture 214.

The detection logic 201 includes input 228 into comparator 230 (e.g., a microcontroller) implemented as firmware or software running on dedicated or shared hardware. The input 228 corresponds to the screw 220 that the detection logic 201 is monitoring. Electrical hysteresis and threshold control 232 calibrates the comparator 230 to consistently detect dislodged threaded fasteners within the portable electronic device. The comparator 230 filters the incoming signal from the input 228 corresponding to the screw 220, monitors the incoming signal for a signal that corresponds to a dislodged threaded fastener, and directs user notification and/or system shutdown of the portable electronic device 104 should a dislodged screw be detected.

Running the detection logic 201 on independent hardware (e.g., a processor, a data storage resource, and/or a power supply) is technically advantageous in that the detection logic 201 may be run independently of other computing systems within the portable electronic device. This may be particularly important should the screw 220 be dislodged and render some portion of the other computing systems within the portable electronic device non-functional. Further, running the detection logic 201 on independent hardware avoids further burdening the other computing systems within the portable electronic device, which may not have bandwidth to run the detection logic 201 without slowing down other portable electronic device processes. Conversely, running the detection logic 201 on shared hardware (e.g., processing and data storage resources) is technically advantageous in that it may be implemented without the additional cost and complexity, and well as physical space utilization, of additional processors and data storage resources.

The fastener detection circuit 242 includes a supply voltage (VDD) (e.g., 3-4 v) and a pull up resistor 244 (e.g., 50-150 ohm) that energizes the fastener detection circuit 242. In STATE A, the screw 220 fully compresses the retention spring 234 and is fully seated within the threaded mating fixture 214. Therefore, the contact pads 238, 240 are in compressive electrical contact with the screw 220, which is turn is electrically connected to the threaded mating fixture 214, which is turn is grounded to a PCB ground and/or a device chassis ground. As the input 228 is below a voltage threshold due to the connection to ground at the threaded mating fixture 214, the detection logic 201 detects that the screw 220 remains seated within the threaded mating fixture 214 and thus permits the portable electronic device to continue normal operations (illustrated as a "√").

In STATE B, the screw 220 partially compresses the retention spring 234 and is partially seated within the threaded mating fixture 214. As the retention spring 234 remains partially compressed, the contact pads 238, 240 remain in compressive electrical contact with the screw 220, which is turn is electrically connected to the threaded mating fixture 214, which is turn is grounded to a PCB ground and/or a device chassis ground. As the input 228 is below a voltage threshold due to the connection to ground at the threaded mating fixture 214, the detection logic 201 still detects that the screw 220 remains seated within the threaded mating fixture 214 and thus still permits the portable electronic device to continue normal operations (illustrated as a "√").

In STATE C, the screw 220 is free of the retention spring 234 and the threaded mating fixture 214. As the screw 220 is no longer in electrical contact with any of the retention spring 234, contact pads 238, 240, and the threaded mating fixture 214, the fastener detection circuit 242 is no longer grounded. The fastener detection circuit 242 is now electrically floating. The screw 220 may move within the portable electronic device in an uncontrolled manner. Absent the presently disclosed technology, uncontrolled contact of the screw 220 is other powered connections within the portable electronic device may cause a ground fault or short. As the input 228 is now above a voltage threshold due to the disconnection to ground at the threaded mating fixture 214, the detection logic 201 detects that the screw 220 has dislodged from fastener hole 218 and shuts down the portable electronic device before the screw 220 has an opportunity to cause a ground fault or short (illustrated as a "x").

In various implementations, the comparator 230 and associated electrical hysteresis and threshold control 232 represents a series of comparators and associated controls, each electrically connected to one of several monitored threaded fasteners (e.g., screw 220), and each responsible for detection that its assigned threaded fastener has become dislodged from its fastener hole. This may be referred to herein as parallel comparators. Any one of the comparators outputting a signal indicating a dislodged comparator may trigger a user notification and/or system shutdown of the portable electronic device.

Figure 3A:
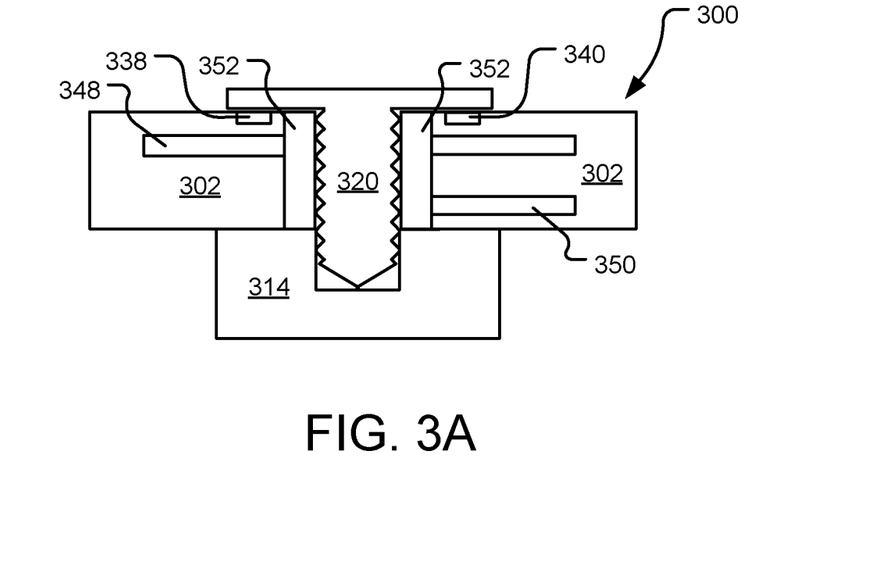
FIG. 3A illustrates a sectional elevation view of a first example fastener retention detection system for a PCB fastener.

FIG. 3A illustrates a sectional elevation view of a first example fastener retention detection system 300 for a PCB fastener 320 (e.g., a screw). PCB 302 may be located within a portable electronic device (not shown). The PCB 302 may be a variety of shapes and sizes and located in a variety of spaces within a housing for the portable electronic device. Further, the device housing may incorporate more than one of the PCB 302.

The PCB 302 includes an insulating substrate with a network of conductive vias, traces, and other conductive paths or areas thereon. The PCB 302 further includes a variety of electronic components (e.g., batteries, capacitors, resistors, microprocessors, storage devices, etc.) soldered to the network of conductive paths on one or both sides of the substrate to create a functional electrical network interconnecting the electronic components on one or both sides of the substrate, as well as through the substrate. The PCB 302 further includes ground planes 348, 350 embedded therein to provide ground connections for the variety of electronic components attached thereto. In various implementations, the PCB 302 may be single-sided, double-sided, or multi-layer.

The PCB 302 is mounted within the portable electronic device using threaded mating fixture 314 (e.g., a structural portion of a chassis or midframe for the portable electronic device), which may not be grounded. A fastener hole is provided in the PCB 302 that matches a corresponding threaded hole in the threaded mating fixture 314 that allows PCB fastener 320 to secure the PCB 302 to the threaded mating fixture 314. Interior surfaces of the fastener hole may be plated with a ground contact 352 (e.g., copper) that electrically connects to the ground planes 348, 350. As a result, the PCB fastener 320 is electrically grounded so long as it is seated within the fastener hole in the PCB 302.

The PCB 302 further includes one or more leads (e.g., contact pads 338, 340) to a fastener detection circuit (not shown, see e.g., fastener detection circuit 242 of FIG. 2). The fastener detection circuit is energized at the contact pads 338, 340. As the PCB fastener 320 is seated within the threaded mating fixture 314 and in contact with the ground contact 352, the contact pads 338, 340 are electrically grounded to the PCB ground. This causes an input to a threaded fastener retention detection logic (not shown, see e.g., logic 201) to fall below a voltage threshold due to the connection to ground at the ground contact 352. Thus, the detection logic detects that the PCB fastener 320 remains sufficiently seated within the threaded mating fixture 314 and thus permits the portable electronic device to continue normal operations. The fastener retention detection system 300 provides a technical benefit of a ground contact for the PCB fastener 320 absent an adequately grounded mating fixture 314.

The threaded mating fixture 314 includes a threaded structural portion of the portable electronic device for attaching the PCB 302 using the PCB fastener 320. In various implementations, the threaded mating fixture 314 may also include a reinforced backing (e.g., a surface-mounted soldered mating fixture) for the PCB 302 that may or may not be threaded. In implementations where the PCB 302 is sufficiently structurally rigid (e.g., sufficiently thick), the reinforced backing may be omitted.

Figure 3B:
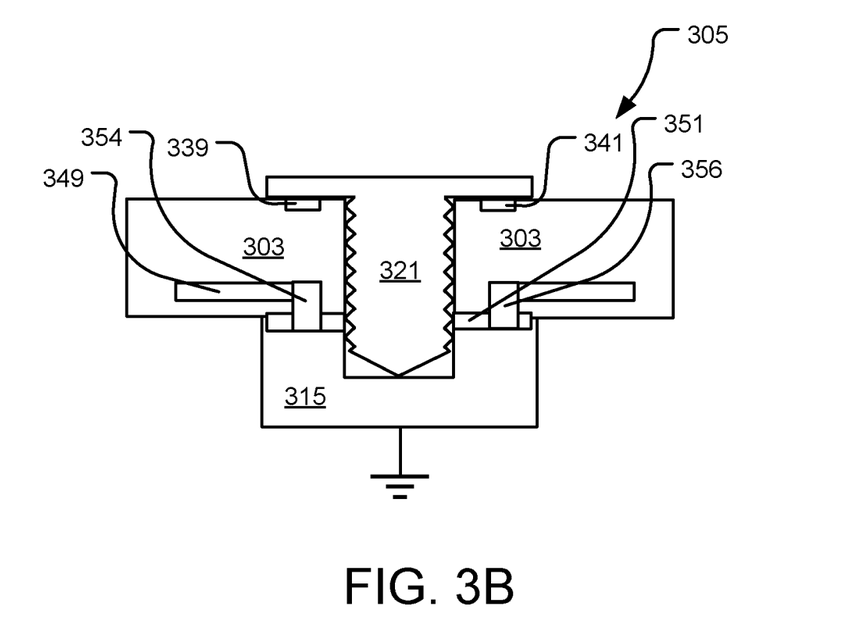
FIG. 3B illustrates a sectional elevation view of a second example fastener retention detection system for a PCB fastener.

FIG. 3B illustrates a sectional elevation view of a second example fastener retention detection system 305 for a PCB fastener 321 (e.g., a screw). PCB 303 may be located within a portable electronic device (not shown). The PCB 303 may be a variety of shapes and sizes and located in a variety of spaces within a housing for the portable electronic device. Further, the device housing may incorporate more than one of the PCB 303.

The PCB 303 includes an insulating substrate with a network of conductive vias (e.g., vias 354, 356), traces, and other conductive paths or areas thereon. The PCB 303 further includes a variety of electronic components (e.g., batteries, capacitors, resistors, microprocessors, storage devices, etc.) soldered to the network of conductive paths on one or both sides of the substrate to create a functional electrical network interconnecting the electronic components on one or both sides of the substrate, as well as through the substrate. The PCB 303 further includes ground planes or pads 349, 351 embedded therein to provide ground connections for the variety of electronic components attached thereto. In various implementations, the PCB 303 may be single-sided, double-sided, or multi-layer.

The PCB 302 is mounted within the portable electronic device using threaded mating fixture 315 (e.g., a structural portion of a chassis or midframe for the portable electronic device), which may be grounded. A fastener hole is provided in the PCB 303 that matches a corresponding threaded hole in the threaded mating fixture 315 that allows PCB fastener 321 to secure the PCB 303 to the threaded mating fixture 315. While the ground plane 349 is not grounded to the PCB fastener 321 within the PCB 303, the vias 354, 356 connect the ground plane 349 to the ground plane or pad 351, which is plated on a bottom side of the PCB 303. The ground plane or pad 351 is in electrical contact with the threaded mating fixture 315, which is in turn grounded to a chassis ground. As a result, the PCB fastener 321 is electrically grounded to both PCB ground and chassis ground so long as it is seated within the fastener hole in the PCB 303.

The PCB 302 further includes one or more leads (e.g., contact pads 339, 341) to a fastener detection circuit (not shown, see e.g., fastener detection circuit 242 of FIG. 2). The fastener detection circuit is energized at the contact pads 339, 341. As the PCB fastener 321 is seated within the threaded mating fixture 315, the contact pads 339, 341 are electrically grounded to the PCB ground and the chassis ground. This causes an input to a threaded fastener retention detection logic (not shown, see e.g., logic 201) to fall below a voltage threshold due to the connection to ground. Thus, the detection logic detects that the PCB fastener 321 remains sufficiently seated within the threaded mating fixture 315 and thus permits the portable electronic device to continue normal operations. The fastener retention detection system provides a technical benefit of ensuring that the screw 320 has an adequate ground contact to both PCB ground and chassis ground via the mating fixture 315.

The threaded mating fixture 315 includes a threaded structural portion of the portable electronic device for attaching the PCB 303 using the PCB fastener 321. In various implementations, the threaded mating fixture 315 may also include a reinforced backing (e.g., a surface-mounted soldered mating fixture) for the PCB 303 that may or may not be threaded. In implementations where the PCB 303 is sufficiently structurally rigid (e.g., sufficiently thick), the reinforced backing may be omitted.

Figure 4:
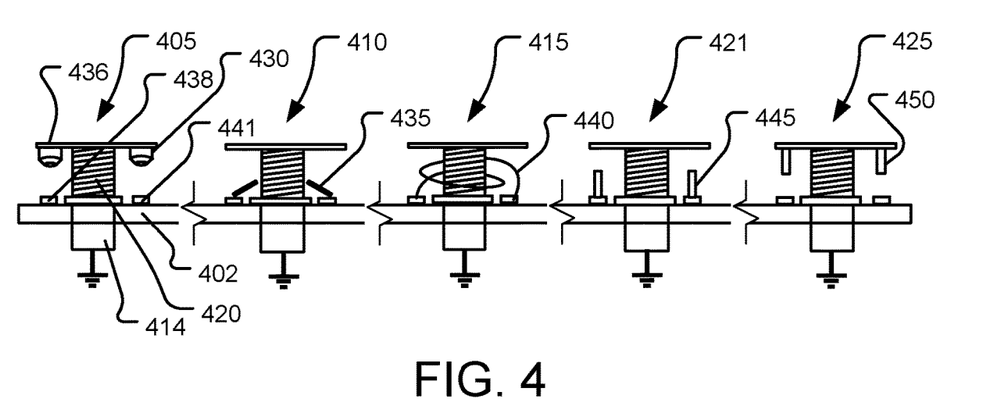
FIG. 4 illustrates several example fastener retention detection arrangements.

FIG. 4 illustrates several example fastener retention detection arrangements 405, 410, 415, 421, 425. PCB 402 may be located within a portable electronic device (not shown). The PCB 402 may be a variety of shapes and sizes and located in a variety of spaces within a housing for the portable electronic device. Further, the device housing may incorporate more than one of the PCB 402.

The PCB 402 includes an insulating substrate with a network of conductive vias, traces, and other conductive paths or areas thereon. The PCB 402 further includes a variety of electronic components (e.g., batteries, capacitors, resistors, microprocessors, storage devices, etc.) soldered to the network of conductive paths on one or both sides of the substrate to create a functional electrical network interconnecting the electronic components on one or both sides of the substrate, as well as through the substrate. The PCB 402 further includes one or more ground planes embedded therein to provide ground connections for the variety of electronic components attached thereto. In various implementations, the PCB 402 may be single-sided, double-sided, or multi-layer.

The PCB 402 is mounted within the portable electronic device using threaded mating fixture 414 (e.g., a structural portion of a chassis or midframe for the portable electronic device). A fastener hole is provided in the PCB 402 that matches a corresponding threaded hole in the threaded mating fixture 414 that allows PCB fastener 420 to secure the PCB 402 to the threaded mating fixture 414. The PCB fastener 420 is electrically grounded to the threaded mating fixture 414 so long as it is seated within the fastener hole in the PCB 402.

The PCB 402 further includes one or more leads (e.g., contact pads 438, 440) to a fastener detection circuit (not shown, see e.g., fastener detection circuit 242 of FIG. 2). The fastener detection circuit is energized at the contact pads 438, 440. So long as the PCB fastener 420 is seated within the threaded mating fixture 414, the contact pads 438, 440 are electrically grounded. This causes an input to a threaded fastener retention detection logic (not shown, see e.g., logic 201) to fall below a voltage threshold due to the connection to ground. Thus, the detection logic detects that the PCB fastener 420 remains sufficiently seated within the threaded mating fixture 414 and thus permits the portable electronic device to continue normal operations.

The fastener retention detection arrangements 405, 410, 415, 421, 425 of FIG. 4 illustrate scenarios where the PCB fastener 420 is not sufficiently seated within the threaded mating fixture 414 and thus the contact pads 438, 440 are not electrically grounded. As the input to the threaded fastener retention detection logic is above a voltage threshold due to the disconnection to ground at the threaded mating fixture 414, the detection logic 201 detects that the PCB fastener 420 has dislodged from fastener hole and shuts down the portable electronic device before the PCB fastener 420 has an opportunity to cause a ground fault or short.

Retention springs 430, 435, 441, 445, 450 provide a configurable tolerance for the PCB fastener 420 to be partially loosened from the threaded mating fixture 414, but still sufficiently attached to allow the portable electronic device to continue normal operation. The stroke and compression profile of the retention springs 430, 435, 441, 445, 450 defines a tolerance for the PCB fastener 420 to be partially loosened from the threaded mating fixture 414. The retention springs 430, 435, 441, 445, 450 also account for noise in the fastener detection circuit caused by a slight looseness of the PCB fastener 420.

Fastener retention detection arrangement 405 includes retention spring 430, which is a resiliently compressible conductive protrusion (e.g., a dimple in the head 436 of the PCB fastener 420 or a rubberized pin or washer infused with conductive material). While two conductive protrusions are depicted, in various implementations, one or more than two conductive protrusions may be used. The resiliently compressible conductive protrusion is attached to an underside of the head 436 of the PCB fastener 420. In other implementations, the resiliently compressible conductive protrusion is attached to the contact pads 438, 440 or loose between the head 436 and the contact pads 438, 440. The resiliently compressible conductive protrusion has a small stroke and a variable compression profile depending on the selected rubberized material and dimensions of the resiliently compressible conductive protrusion.

Fastener retention detection arrangement 410 includes retention spring 435, which is a spring washer (e.g., a split lock-washer, a wave washer, or a conical spring washer). The spring washer rests loose on the contact pads 438, 440. In other implementations, the spring washer is attached to an underside of the head 436 or a top side of the contact pads 438, 440. The spring washer has a small stroke and a variable compression profile depending on the selected type, material, and dimensions of the spring washer.

Fastener retention detection arrangement 415 includes retention spring 441, which is a coil or helical spring. The coil or helical spring rests loose on the contact pads 438, 440. In other implementations, the coil or helical spring is attached to an underside of the head 436 or a top side of the contact pads 438, 440. The spring washer has a variable stroke and a variable compression profile depending on the selected type, material, and dimensions of the coil or helical spring.

Fastener retention detection arrangement 421 includes retention spring 445, which is a conductive pogo pin. While two conductive pogo pins are depicted, in various implementations, one or more than two conductive pogo pins may be used. The conductive pogo pin is attached to a top side of the contact pads 438, 440. The conductive pogo pin has a variable stroke and a variable compression profile depending on the selected material and dimensions of the conductive pogo pin.

Fastener retention detection arrangement 425 includes retention spring 450, which is a conductive pogo pin. While two conductive pogo pins are depicted, in various implementations, one or more than two conductive pogo pins may be used. The conductive pogo pin is attached to an underside of the head 436 of the PCB fastener 420. The conductive pogo pin has a variable stroke and a variable compression profile depending on the selected material and dimensions of the conductive pogo pin.

Selection of a specific type of spring washer (or other type of retention spring 435) may depend on the desired stroke and compression profile for the retention spring 435. Some options may be technically advantageous over other options to achieve the desired stroke and compression profile. Stated differently, the fastener retention detection arrangements 405, 410, 415, 421, 425 and corresponding retention springs 430, 435, 441, 445, 450 provides a technical benefit of providing a variable stroke and a variable compression profile for various applications of a fastener retention detection system.

Figure 5:
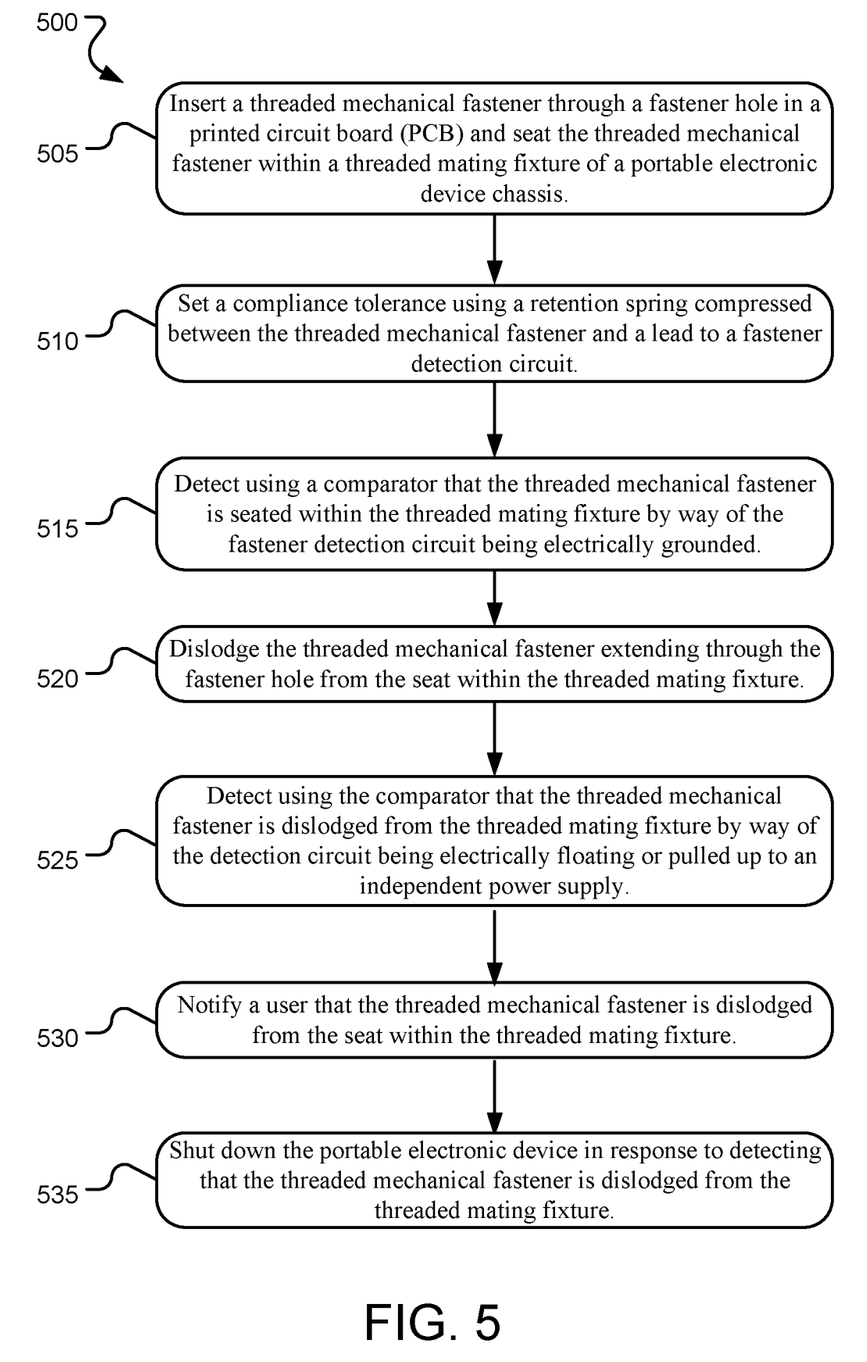
FIG. 5 illustrates example operations for using a threaded fastener retention detection system.

FIG. 5 illustrates example operations 500 for using a threaded fastener retention detection system. In various implementations, the threaded fastener retention detection system may be used within a portable electronic device. An insertion operation 505 inserts a threaded mechanical fastener through a fastener hole in a printed circuit board (PCB) and seats the threaded mechanical fastener within a threaded mating fixture of a chassis for the portable electronic device. The insertion operation 505 secures the PCB to the device chassis. The threaded mechanical fastener is electrically grounded through one or both of a ground plane for the PCB and the threaded mating fixture and the threaded mechanical fastener is in compressive electrical contact with a lead to a fastener detection circuit.

A setting operation 510 sets a compliance tolerance using a retention spring compressed between the threaded mechanical fastener and the lead to the fastener detection circuit. The compliance tolerance is defined by retention spring stroke and compression profile of the retention spring. Selection of a specific type, as well as material and dimensions, of the retention spring yields a technically advantageous solution to achieve the desired retention spring stroke and compression profile of the retention spring within an allotted space within the portable electronic device. A detecting operation 515 detects using a comparator that the threaded mechanical fastener is seated within the threaded mating fixture by way of the fastener detection circuit being electrically grounded through one or both of the ground plane and the threaded mating fixture. In various implementations, the setting operation 510 is performed during manufacturing the portable electronic device, while the detecting operation 515 is initiated during manufacturing the portable electronic device and continues throughout the usable life of the portable electronic device.

A dislodging operation 520 dislodges the threaded mechanical fastener extending through the fastener hole from the seat within the threaded mating fixture. The dislodging operation 520 may be caused by dropping or otherwise rough handling of the portable electronic device. A detecting operation 525 detects using the comparator that the threaded mechanical fastener is dislodged from the threaded mating fixture by way of the detection circuit being electrically floating or pulled up to an independent power supply (VDD). This is caused by the threaded mechanical fastener ceasing to connect the detection circuit to electrical ground through one or both of the ground plane and the threaded mating fixture.

In response to the detecting operation 525, a notifying operation 530 notifies a user that the threaded mechanical fastener is dislodged from the seat within the threaded mating fixture. In lieu of or in addition to the notifying operation 530, a shutting down operation 535 shuts down the portable electronic device in response to detecting that the threaded mechanical fastener is dislodged from the threaded mating fixture. In various implementations, the dislodging operation 520, the notifying operation 530, and the shutting down operation 535 may occur at any point in time subsequent to the detecting operation 515 during manufacturing, shipping, and use of the portable electronic device.

The operations making up the embodiments of the invention described herein are referred to variously as operations, steps, objects, or modules. The operations may be performed in any order, adding or omitting operations as desired, unless explicitly claimed otherwise or a specific order is inherently necessitated by the claim language.

Figure 6:
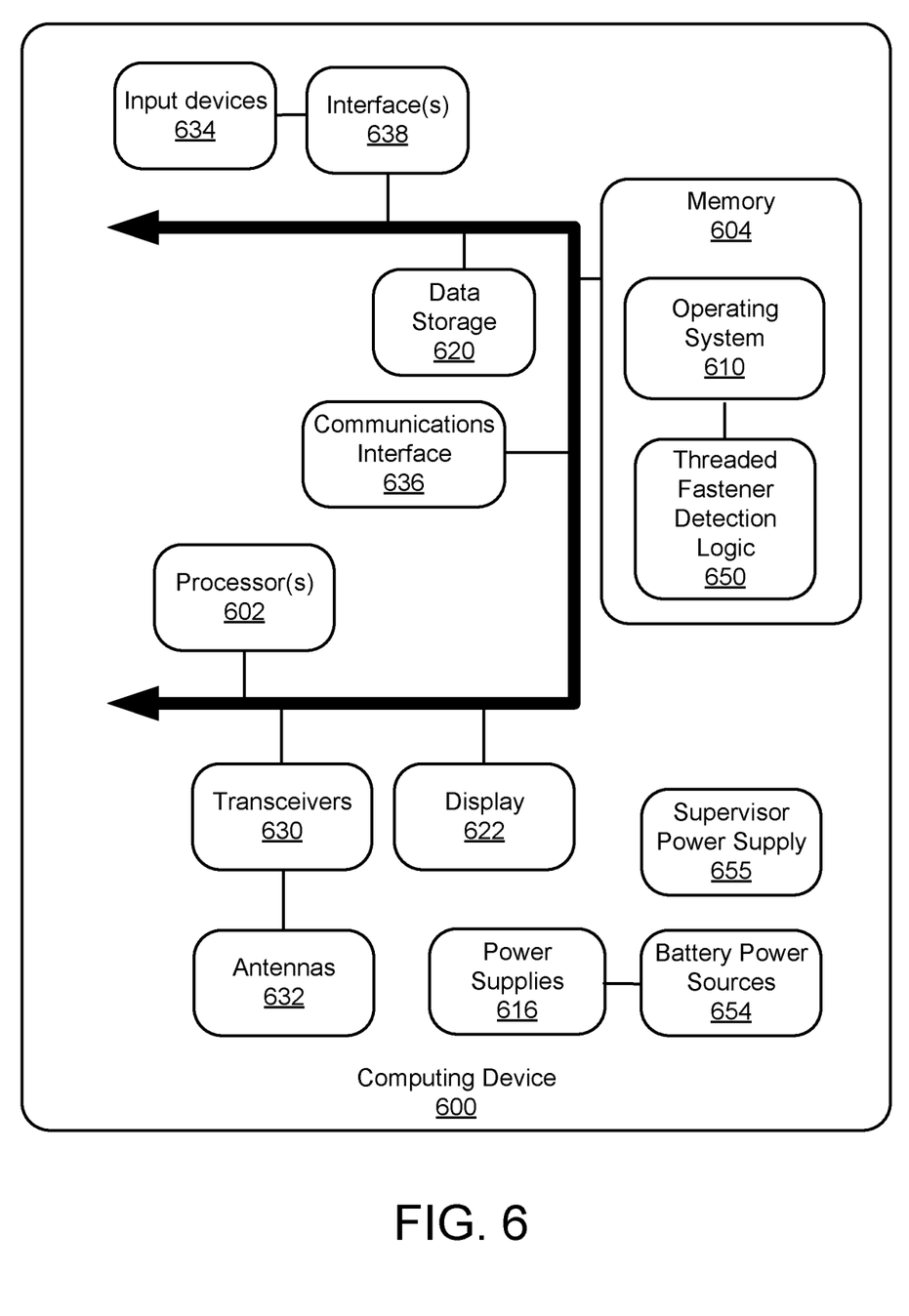
FIG. 6 illustrates an example computing device for use in executing threaded fastener retention detection logic.

FIG. 6 illustrates an example computing device 600 for use in executing threaded fastener retention detection logic 650. The computing device 600 may be a client device, such as a laptop, mobile device, desktop, tablet, or a server/cloud device. The computing device 600 includes one or more processor(s) 602 and a memory 604. The memory 604 generally includes both volatile memory (e.g., RAM) and non-volatile memory (e.g., flash memory). An operating system 610 resides in the memory 604 and is executed by the processor(s) 602.

One or more modules or segments, such as the fastener retention detection logic 650, application modules, and other modules, are loaded into the operating system 610 on the memory 604 and/or data storage 620 and executed by processor(s) 602. In various implementations, the fastener retention detection logic 650 drives operation of a corresponding fastener retention detection system. The computing device 600 includes power supplies 616, which are powered by battery power sources 654 or other power sources and provide power to components of the computing device 600. The power supplies 616 may also be connected to an external power source that overrides or recharges battery cells within the battery power sources 654.

The computing device 600 may further include supervisor power supply 655 that may also include a battery power source, which can ensure system safety redundancy with separation from the power supplies 616 and battery power sources 654. The supervisor power supply 655 provides a supply voltage (VDD) and an associated detection circuit for the fastener retention detection logic 650. Separation of the supervisor power supply 655 from the power supplies 616/battery power sources 654 allows the fastener retention detection logic 650 to continue operating even when a problem (e.g., a fastener fall-off event) occurs that may render the power supplies 616/battery power sources 654 unavailable. This independent system may further report to the user through separate notifications after the problematic system is shut down.

The computing device 600 may include one or more communication transceivers 630 which may be connected to one or more antenna(s) 632 to provide network connectivity (e.g., mobile phone network, Wi-Fi®, Bluetooth®) to one or more other servers and/or client devices (e.g., mobile devices, desktop computers, or laptop computers). The computing device 600 may further include a communications interface 636, which may be used for establishing connections over a wide-area network (WAN) or local-area network (LAN). The network connections shown are exemplary and that other communications devices for establishing a communications link between the computing device 600 and other devices may be used.

The computing device 600 may further include one or more input devices 634 such that a user may enter commands and information (e.g., a keyboard or mouse). These and other input devices may be coupled to the computing device 600 by one or more interfaces 638 such as a serial port interface, parallel port, or universal serial bus (USB). The computing device 600 may further include a display 622, such as a touch screen display.

The computing device 600 may include a variety of tangible processor-readable storage media and intangible processor-readable communication signals. Tangible processor-readable storage can be embodied by any available media that can be accessed by the computing device 600 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 600.

In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared, and other wireless media.

Implementations disclosed herein include a printed circuit board (PCB) fastener retention detection system for a portable electronic device. The system comprises a chassis for the portable electronic device including a threaded mating fixture, a PCB including a fastener hole, a fastener detection circuit, and a ground plane, wherein the fastener hole is axially aligned with the threaded mating fixture, a threaded mechanical fastener extending through the fastener hole and seated within the threaded mating fixture thereby securing the PCB to the chassis, the threaded mechanical fastener electrically grounded through one or both of the ground plane and the threaded mating fixture, the threaded mechanical fastener in compressive electrical contact with a lead to the fastener detection circuit, and a comparator to determine that the threaded mechanical fastener is seated within the threaded mating fixture by way of the fastener detection circuit being electrically grounded through one or both of the ground plane and the threaded mating fixture.

Implementations disclosed herein further include a retention spring compressed between the threaded mechanical fastener and the lead to the fastener detection circuit, the retention spring to set a compliance tolerance on the seat for the threaded mechanical fastener within the threaded mating fixture.

In implementations disclosed herein, retention spring stroke and compression profile define the compliance tolerance on the threaded mechanical fastener seat within the threaded mating fixture.

In implementations disclosed herein, the retention spring is a compression spring taking a form of one or more of a resiliently compressible conductive protrusion, a coil, a pogo pin, a resiliently compressible conductive washer, a split lock-washer, a wave washer, and a conical spring washer.

In implementations disclosed herein, the lead to the fastener detection circuit includes a pair of contact pads on opposing sides of the fastener hole in the PCB.

In implementations disclosed herein, the fastener hole is copper plated and electrically connected to the ground plane of the PCB.

In implementations disclosed herein, the threaded mating fixture is electrically connected to the ground plane of the PCB.

In implementations disclosed herein, the comparator is implemented as a dedicated microcontroller within the portable electronic device.

In implementations disclosed herein, the comparator is implemented as firmware running on shared hardware within the portable electronic device.

In implementations disclosed herein, the chassis for the portable electronic device includes multiple threaded mating fixtures, and the PCB includes multiple fastener holes and multiple fastener detection circuits, wherein each of the fastener holes is axially aligned with one of the threaded mating fixtures. The PCB fastener retention detection system further comprises multiple threaded mechanical fasteners, each extending through one of the fastener holes and seated within a corresponding one of the threaded mating fixtures, the threaded mechanical fasteners electrically grounded through one or both of the ground plane and the threaded mating fixtures, the threaded mechanical fasteners each in compressive electrical contact with a lead to the fastener detection circuit, wherein each of the multiple fastener detection circuits is assigned to one of the multiple threaded mechanical fasteners; and multiple comparators, each to determine that one of the threaded mechanical fasteners is seated within a corresponding threaded mating fixture by way of the corresponding detection circuit being electrically grounded through one or both of the ground plane and the threaded mating fixtures.

Implementations disclosed herein include a method of detecting fastener retention within a portable electronic device. The method comprises inserting a threaded mechanical fastener through a fastener hole in a printed circuit board (PCB) and seat the threaded mechanical fastener within a threaded mating fixture of a chassis for the portable electronic device thereby securing the PCB to the chassis, the threaded mechanical fastener electrically grounded through one or both of a ground plane for the PCB and the threaded mating fixture, the threaded mechanical fastener in compressive electrical contact with a lead to a fastener detection circuit; and detecting using a comparator that the threaded mechanical fastener is seated within the threaded mating fixture by way of the fastener detection circuit being electrically grounded through one or both of the ground plane and the threaded mating fixture.

Implementations disclosed herein further include dislodging the threaded mechanical fastener extending through the fastener hole from the seat within the threaded mating fixture; and detecting using the comparator that the threaded mechanical fastener is dislodged from the threaded mating fixture by way of the fastener detection circuit being electrically disconnected from ground.

Implementations disclosed herein further include notifying a user that the threaded mechanical fastener is dislodged from the seat within the threaded mating fixture.

Implementations disclosed herein further include shutting down the portable electronic device in response to detecting that the threaded mechanical fastener is dislodged from the threaded mating fixture.

Implementations disclosed herein further include setting a compliance tolerance using a retention spring compressed between the threaded mechanical fastener and the lead to the fastener detection circuit.

Implementations disclosed herein include a portable electronic device comprising a chassis for the portable electronic device including a threaded mating fixture; a PCB including a fastener hole, a fastener detection circuit, and a ground plane, wherein the fastener hole is axially aligned with the threaded mating fixture; a threaded mechanical fastener extending through the fastener hole and seated within the threaded mating fixture thereby securing the PCB to the chassis, the threaded mechanical fastener electrically grounded through one or both of the ground plane and the threaded mating fixture, the threaded mechanical fastener in compressive electrical contact with a lead to the fastener detection circuit; a retention spring compressed between the threaded mechanical fastener and the lead to the fastener detection circuit, the retention spring to set a compliance tolerance on the seat for the threaded mechanical fastener within the threaded mating fixture; and a comparator to determine that the threaded mechanical fastener is seated within the threaded mating fixture by way of the fastener detection circuit being electrically grounded through one or both of the ground plane and the threaded mating fixture.

In implementations disclosed herein, retention spring stroke and compression profile define the compliance tolerance on the seat for the threaded mechanical fastener within the threaded mating fixture.

In implementations disclosed herein, the retention spring is a compression spring taking a form of one or more of a resiliently compressible conductive protrusion, a coil, a pogo pin, a resiliently compressible conductive washer, a split lock-washer, a wave washer, and a conical spring washer.

In implementations disclosed herein, the fastener hole is copper plated and electrically connected to the ground plane of the PCB.

In implementations disclosed herein, the threaded mating fixture is electrically connected to the ground plane of the PCB.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A printed circuit board (PCB) fastener retention detection system for a electronic device, the system comprising:
   a chassis for the electronic device including a threaded mating fixture;
   a PCB including a fastener hole, a fastener detection circuit, and a ground plane, wherein the fastener hole is axially aligned with the threaded mating fixture;
   a threaded mechanical fastener extending through the fastener hole and seated within the threaded mating fixture thereby securing the PCB to the chassis, the threaded mechanical fastener electrically grounded through one or both of the ground plane and the threaded mating fixture, the threaded mechanical fastener in compressive electrical contact with a lead to the fastener detection circuit; and
   a comparator to determine that the threaded mechanical fastener is seated within the threaded mating fixture by way of the fastener detection circuit being electrically grounded through one or both of the ground plane and the threaded mating fixture.

2. The PCB fastener retention detection system of claim 1, further comprising:
   a retention spring compressed between the threaded mechanical fastener and the lead to the fastener detection circuit, the retention spring to set a compliance tolerance on the seat for the threaded mechanical fastener within the threaded mating fixture.

3. The PCB fastener retention detection system of claim 2, wherein retention spring stroke and compression profile define the compliance tolerance on the threaded mechanical fastener seat within the threaded mating fixture.

4. The PCB fastener retention detection system of claim 2, wherein the retention spring is a compression spring taking a form of one or more of a resiliently compressible conductive protrusion, a coil, a pogo pin, a resiliently compressible conductive washer, a split lock-washer, a wave washer, and a conical spring washer.

5. The PCB fastener retention detection system of claim 1, wherein the lead to the fastener detection circuit includes a pair of contact pads on opposing sides of the fastener hole in the PCB.

6. The PCB fastener retention detection system of claim 1, wherein the fastener hole is copper plated and electrically connected to the ground plane of the PCB.

7. The PCB fastener retention detection system of claim 1, wherein the threaded mating fixture is electrically connected to the ground plane of the PCB.

8. The PCB fastener retention detection system of claim 1, wherein the comparator is implemented as a dedicated microcontroller within the electronic device.

9. The PCB fastener retention detection system of claim 1, wherein the comparator is implemented as firmware running on shared hardware within the electronic device.

10. The PCB fastener retention detection system of claim 1, wherein the chassis for the electronic device includes multiple threaded mating fixtures, and the PCB includes multiple fastener holes and multiple fastener detection circuits, wherein each of the fastener holes is axially aligned with one of the threaded mating fixtures, the PCB fastener retention detection system further comprising:
    multiple threaded mechanical fasteners, each extending through one of the fastener holes and seated within a corresponding one of the threaded mating fixtures, the threaded mechanical fasteners electrically grounded through one or both of the ground plane and the threaded mating fixtures, the threaded mechanical fasteners each in compressive electrical contact with a lead to the fastener detection circuit, wherein each of the multiple fastener detection circuits is assigned to one of the multiple threaded mechanical fasteners; and
    multiple comparators, each to determine that one of the threaded mechanical fasteners is seated within a corresponding threaded mating fixture by way of the corresponding detection circuit being electrically grounded through one or both of the ground plane and the threaded mating fixtures.

11. A electronic device comprising:
    a chassis for the electronic device including a threaded mating fixture;
    a PCB including a fastener hole, a fastener detection circuit, and a ground plane, wherein the fastener hole is axially aligned with the threaded mating fixture;
    a threaded mechanical fastener extending through the fastener hole and seated within the threaded mating fixture thereby securing the PCB to the chassis, the threaded mechanical fastener electrically grounded through one or both of the ground plane and the threaded mating fixture, the threaded mechanical fastener in compressive electrical contact with a lead to the fastener detection circuit;
    a retention spring compressed between the threaded mechanical fastener and the lead to the fastener detection circuit, the retention spring to set a compliance tolerance on the seat for the threaded mechanical fastener within the threaded mating fixture; and
    a comparator to determine that the threaded mechanical fastener is seated within the threaded mating fixture by way of the fastener detection circuit being electrically grounded through one or both of the ground plane and the threaded mating fixture.

12. The electronic device of claim 11, wherein retention spring stroke and compression profile define the compliance tolerance on the seat for the threaded mechanical fastener within the threaded mating fixture.

13. The electronic device of claim 11, wherein the retention spring is a compression spring taking a form of one or more of a resiliently compressible conductive protrusion, a coil, a pogo pin, a resiliently compressible conductive washer, a split lock-washer, a wave washer, and a conical spring washer.

14. The electronic device of claim 11, wherein the fastener hole is copper plated and electrically connected to the ground plane of the PCB.

15. The electronic device of claim 11, wherein the threaded mating fixture is electrically connected to the ground plane of the PCB.

* * * * *